US012519211B2

(12) United States Patent
Suh et al.

(10) Patent No.: US 12,519,211 B2
(45) Date of Patent: Jan. 6, 2026

(54) ANTENNA MODULE IMPLEMENTED IN MULTI-LAYERED SUBSTRATE

(71) Applicant: LG ELECTRONICS INC., Seoul (KR)

(72) Inventors: Yusuhk Suh, Seoul (KR); Dongik Lee, Seoul (KR); Seungmin Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 42 days.

(21) Appl. No.: 18/734,976

(22) Filed: Jun. 5, 2024

(65) Prior Publication Data

US 2025/0007146 A1 Jan. 2, 2025

(30) Foreign Application Priority Data

Jun. 27, 2023 (KR) ........................ 10-2023-0082874

(51) Int. Cl.

| | |
|---|---|
| ***H01Q 1/22*** | (2006.01) |
| ***H01Q 1/48*** | (2006.01) |
| ***H01Q 9/04*** | (2006.01) |
| ***H01Q 21/24*** | (2006.01) |

(52) U.S. Cl.

CPC ............. *H01Q 1/2283* (2013.01); *H01Q 1/48* (2013.01); *H01Q 9/0414* (2013.01); *H01Q 21/24* (2013.01)

(58) Field of Classification Search

CPC .......... H01Q 1/22; H01Q 1/2283; H01Q 1/38; H01Q 1/48; H01Q 1/523; H01Q 9/014; H01Q 9/0457; H01Q 21/0006; H01Q 21/062; H01Q 21/065; H01Q 21/24; H01Q 21/28

See application file for complete search history.

(56) References Cited

FOREIGN PATENT DOCUMENTS

| | | | | |
|---|---|---|---|---|
| CN | 110534924 A | * 12/2019 | ............. | H01Q 23/00 |
| CN | 116130937 A | * 5/2023 | ............... | H01Q 1/36 |

* cited by examiner

*Primary Examiner* — Hoang V Nguyen

(74) *Attorney, Agent, or Firm* — LEE, HONG, DEGERMAN, KANG & WAIMEY

(57) ABSTRACT

An antenna module implemented in a multi-layered antenna package includes an RFIC; a first dielectric layer; a first coplanar waveguide layer disposed on a top of the first dielectric layer and configured to receive RF signals transmitted by an interface layer of the RFIC; a first antenna portion disposed on the first coplanar waveguide layer and configured to radiate signals transmitted from the first coplanar waveguide layer; a second coplanar waveguide layer disposed on a top of the third dielectric layer and configured to receive RF signals transmitted by the interface layer of the RFIC; and a second antenna portion disposed on the second coplanar waveguide layer to radiate signals transmitted from the second coplanar waveguide layer.

10 Claims, 8 Drawing Sheets

(b)

(a)

(b)

(a)

(b)

(a)

(b)

ANTENNA MODULE IMPLEMENTED IN MULTI-LAYERED SUBSTRATE

CROSS-REFERENCE TO RELATED APPLICATION

Pursuant to 35 U.S.C. § 119(a), this application claims the benefit of the earlier filing date and the right of priority to Korean Patent Application No. 10-2023-0082874, filed on Jun. 27, 2023, the contents of which are all incorporated by reference herein in its entirety.

TECHNICAL FIELD

The present disclosure relates to an antenna module implemented in a multi-layered substrate. One particular implementation relates to an electronic device having an antenna module implemented in a multi-layered substrate.

BACKGROUND

As image technology changes from analog to digital, development has been made from SD (Standard-Definition) to HD (Hi-Definition) to provide an image closer to a real world. SD supports a resolution of 704×480 and consists of about 350,000 pixels, and HD is divided into HD and Full HD. Between them, Full HD supports a resolution of 1920×1080 and consists of 2 million pixels to provide a significantly higher quality image compared to SD.

Recent image technology is growing one step further to Ultra High-Definition (UHD) beyond Full HD, and the UHD, which supports high image quality and ultra-high resolution, is spotlighted as a next-generation media environment. The UHD supports 4 K (3840×2160) and 8 K (7680×4320) resolutions and surround audio of up to 22.2 channels. Compared to the HD, the UHD provides 4 times higher picture quality than the 4 K UHD, and the 8 K UHD provides 16 times higher image quality than the HD.

In recent years, a wireless display system that wirelessly transmits such a high-resolution image to a display device has emerged.

The wireless display system is a system that transmits and receives A/V data between an A/V transmitting device and an A/V receiving device through a local area network.

The A/V receiving device displays A/V data received from the A/V transmitting device.

An example of the A/V transmitting device may be a transmission box having an antenna module that wirelessly transmits A/V data.

An example of the A/V receiving device may be a display device provided with an antenna module that receives A/V data transmitted from the A/V transmitting device to output the received A/V data.

The display device may include a pair of antenna modules and an IR module located between the pair of antenna modules, and the pair of antenna modules may be disposed to spaced apart from each other on left and right sides thereof.

In the wireless display system, an antenna module of the A/V transmitting device may be located on the left or right side of the display device, and in this case, a pair of antenna modules provided in the display device may receive data transmitted from the antenna module of the A/V transmitting device in a two-stream method, and the display device may output an image.

When the A/V transmitting device is disposed on the left or right side of the display device, one of the pair of antenna modules of the display device cannot receive data because its signal is blocked by the IR module, and the display device operates with one stream.

When operating with one stream, its compression rate must be doubled compared to the case with two streams to transmit and receive data at the same level as in the case of two streams, but when the compression rate is increased, its image quality level may be decreased.

SUMMARY

An aspect of the present disclosure is to provide an electronic device capable of performing wireless communication of A/V data regardless of the location of an A/V transmitting device.

Another aspect of the present disclosure is to perform A/V wireless communication in an optimized manner according to an array antenna disposition structure of an A/V transmitting device and an electronic device.

Still another aspect of the present disclosure is to perform A/V wireless communication in an optimized manner in consideration of the location of an A/V transmitting device and an electronic device, and the polarization characteristics of an array antenna.

Yet still another aspect of the present disclosure is to provide seamless A/V wireless communication even when an obstacle is disposed on a wireless communication path between an A/V transmitting device and an electronic device.

Yet still another aspect of the present disclosure is to implement an antenna module that is capable of transmitting signals over a long distance to a front region of an A/V transmission device and that is also capable of transmitting signals upward.

Yet still another aspect of the present disclosure is to implement an antenna module that is capable of implementing a wider beam coverage in side regions of an A/V transmission device than that in a front or bottom regions.

An antenna module implemented in a multi-layered antenna package according to the present disclosure includes an RFIC; a first dielectric layer; a first coplanar waveguide layer disposed on a top of the first dielectric layer and configured to receive RF signals transmitted by an interface layer of the RFIC; a first antenna portion disposed on the first coplanar waveguide layer and configured to radiate signals transmitted from the first coplanar waveguide layer; a second dielectric layer disposed on the first coplanar waveguide layer; a third dielectric layer disposed on the second dielectric layer; a second coplanar waveguide layer disposed on a top of the third dielectric layer and configured to receive RF signals transmitted by the interface layer of the RFIC; and a second antenna portion disposed on the second coplanar waveguide layer to radiate signals transmitted from the second coplanar waveguide layer.

According to an embodiment, the antenna module may further include a fourth dielectric layer disposed on the third dielectric layer. The first coplanar waveguide layer may include a plurality of first signals connection lines and a first ground portion. The plurality of first signal connection lines and the first ground portion may be disposed to be flush with each other on the top of the first dielectric layer, and the first dielectric layer and the second dielectric layer may operate as shields of the first coplanar waveguide layer.

According to an embodiment, the first coplanar waveguide layer may include a plurality of second signal connection lines and a second ground portion. The plurality of second signal connection lines and the second ground portion may be disposed to be flush with each other on the top of the third dielectric layer, and the third dielectric layer and the fourth dielectric layer may operate as shields of the second coplanar waveguide layer.

An electronic device according to an embodiment of the present disclosure may perform wireless communication of A/V data regardless of the location of an A/V transmitting device through first and second antenna structures in which a plurality of array antennas are disposed.

Furthermore, the A/V transmitting device may transmit two streams of data, thereby minimizing video quality deterioration that occurs when increasing a data compression rate.

In addition, since a horizontally polarized antenna and a vertically polarized antenna can be disposed together on one substrate, thereby allowing an antenna module to be compact and providing a high data reception rate.

Moreover, horizontally and vertically polarized signals may be used according to an array antenna disposition structure of the A/V transmitting device and the electronic device, thereby performing A/V wireless communication with reduced mutual interference while increasing a communication capacity.

Besides, horizontally and vertically polarized signals may be used in consideration of the location of the A/V transmitting device and electronic device the polarization characteristics of the array antennas, thereby performing A/V wireless communication with reduced mutual interference while increasing a communication capacity.

In addition, even when an obstacle is disposed on a wireless communication path between the A/V transmitting device and the electronic device, a beamforming direction may be changed and reflected waves may be used, thereby providing seamless A/V wireless communication.

Also, the number of array antennas disposed in a front region of the antenna module of the A/V transmitting device may be greater than the number of antennas in a side region or bottom region. Accordingly, signals can be transmitted over a longer distance in the front region of the antenna module than in the side region or bottom region. Also, an antenna module that has two-dimensional array antennas and is capable of transmitting signals even upward through beamforming can be implemented.

Also, the number of array antennas disposed in side regions of the antenna module of the A/V transmitting device may be greater than the number of antennas in other areas. Accordingly, an antenna module capable of achieving a wider beam coverage in the side regions than that in a front or bottom region can be implemented.

Each of a plurality of array antennas can be disposed in different stacked structures in different regions while implementing a coplanar waveguide structure, thereby minimizing interference between different array antennas.

Further scope of applicability of the present disclosure will become apparent from the following detailed description. It should be understood, however, that the detailed description and specific examples, such as the preferred embodiments of the present disclosure, are given by way of illustration only, since various modifications and alternations within the spirit and scope of the disclosure will be apparent to those skilled in the art.

DETAILED DESCRIPTION OF THE EMBODIMENTS

A description will now be given in detail of specific embodiments of the present disclosure, together with drawings.

Hereinafter, a description will be given in more detail of embodiments related to the present disclosure, with reference to the accompanying drawings. In general, a suffix such as "module" and "unit" may be used to refer to elements or components. Use of such a suffix herein is merely intended to facilitate description of the specification, and the suffix itself is not intended to give any special meaning or function.

Figure 1:
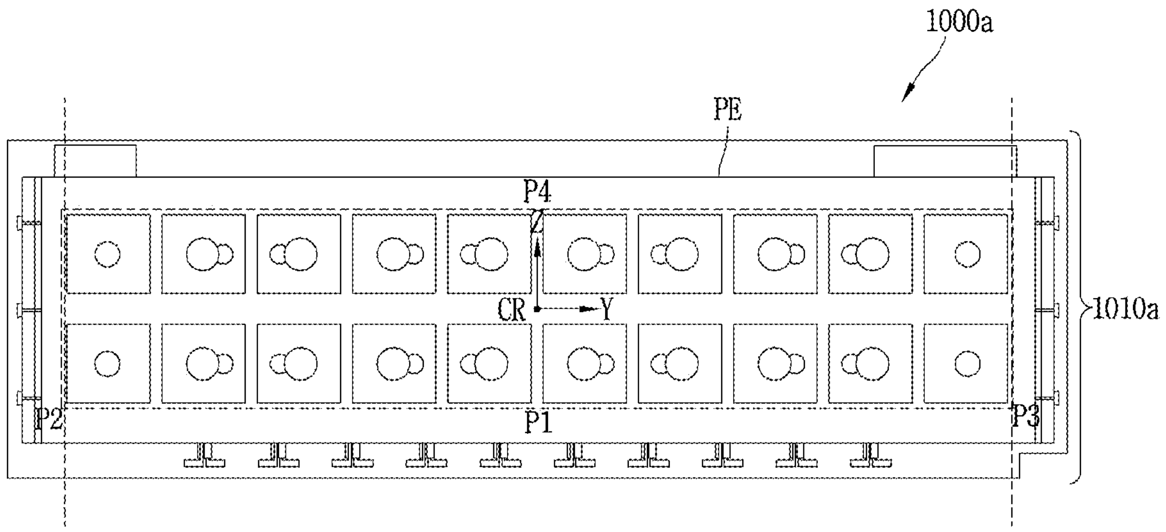
FIGS. 1 and 2 are front and sectional views illustrating a substrate having antenna modules that may be disposed on one side of an electronic device.
Figure 1:
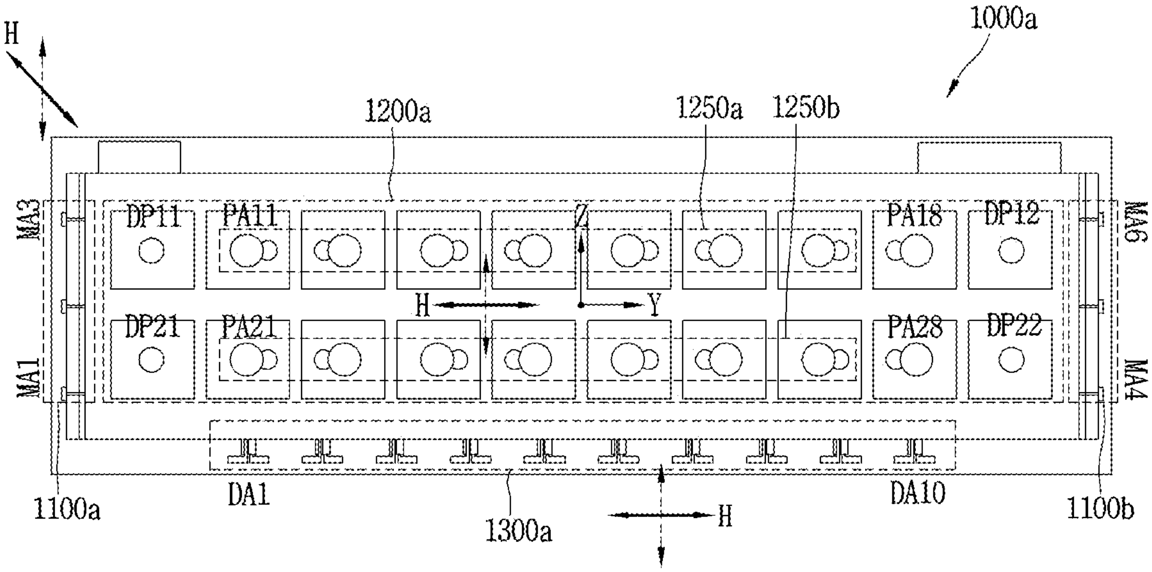
Figure 2:
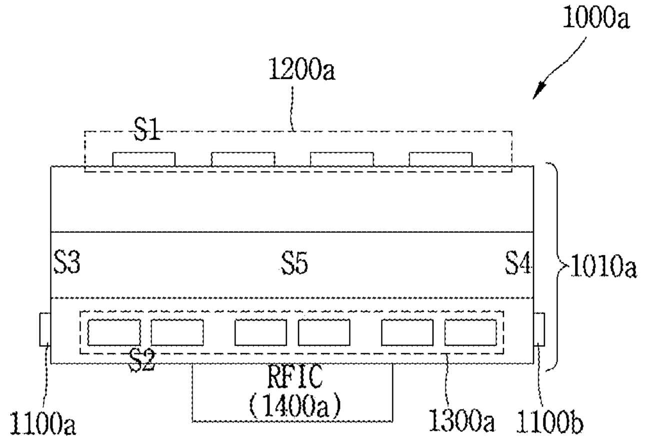
Figure 2:
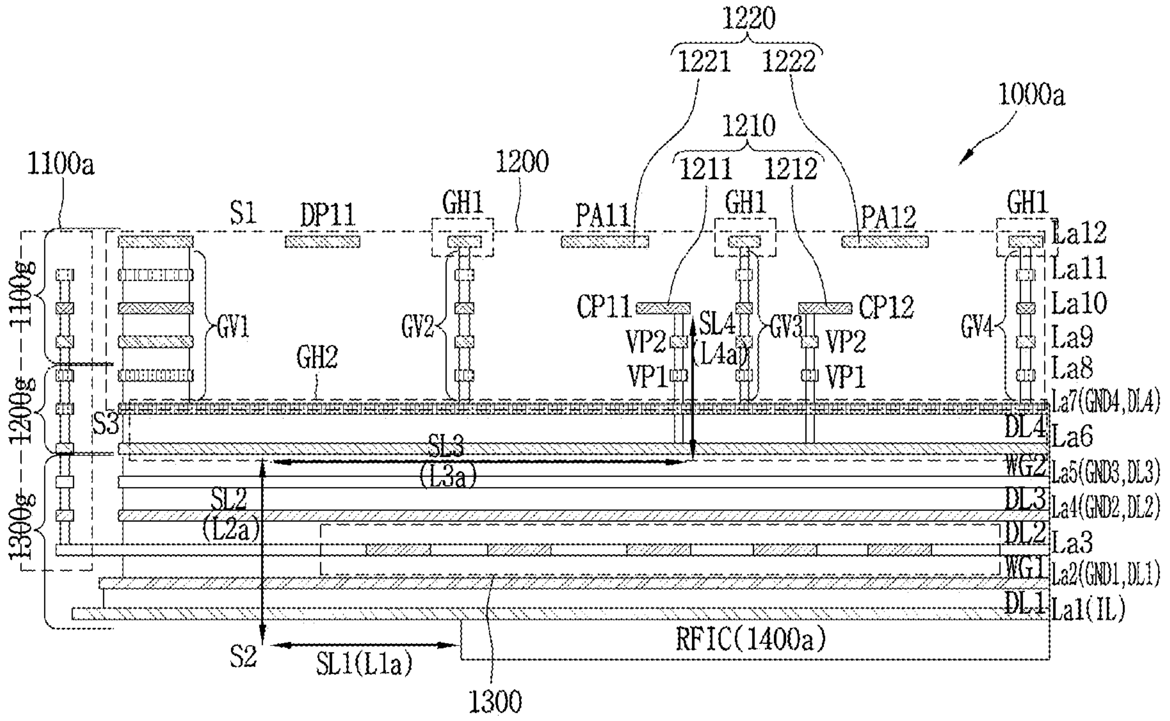
Figure 3:
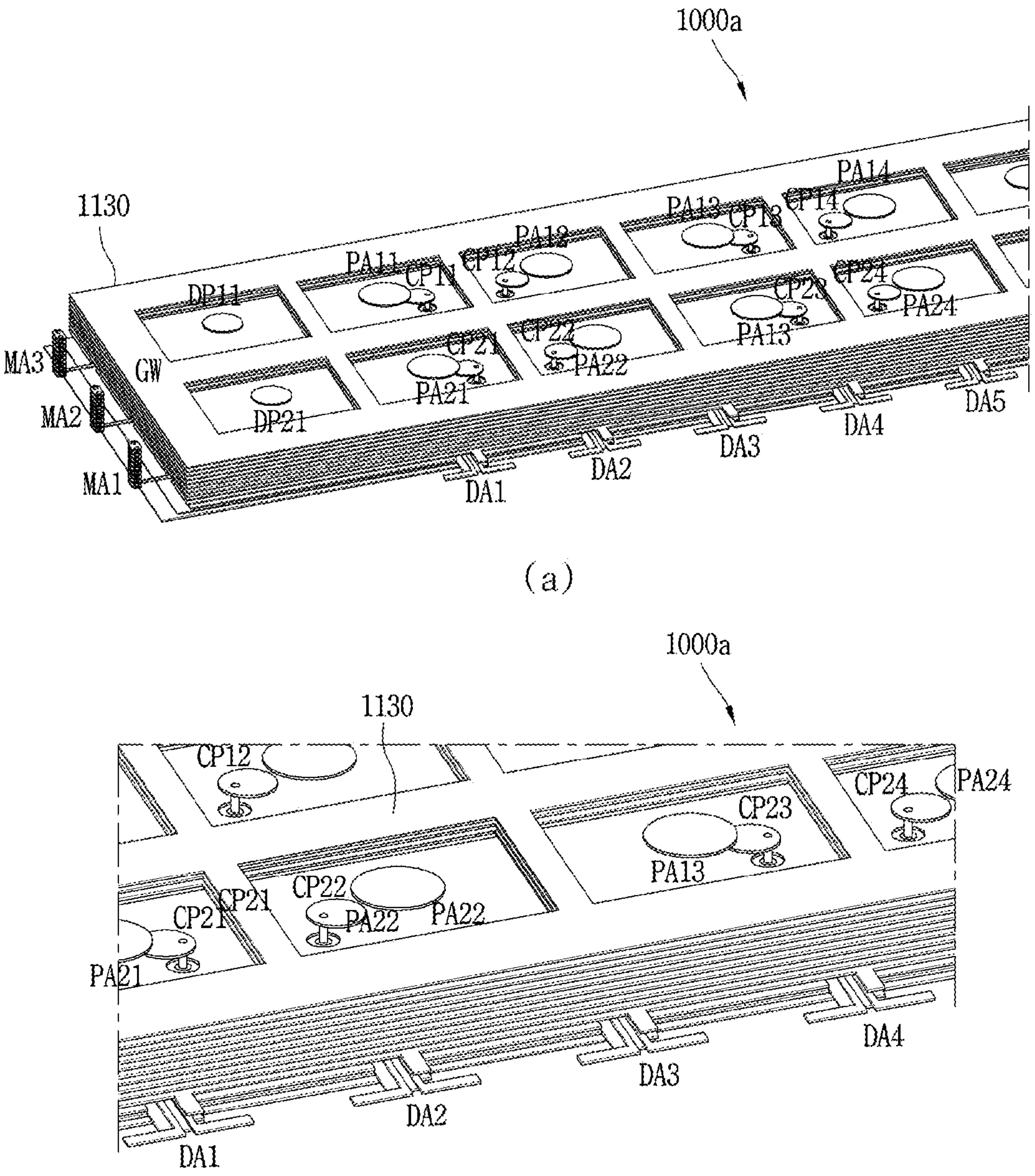
FIG. 3 shows a perspective view of the antenna module of FIG. 2 and an enlarged view of a partial area.

Hereinafter, an antenna module disposed in an electronic device according to the present disclosure will be described. In this regard, FIGS. 1 and 2 are front and sectional views illustrating a substrate having an antenna module that may be disposed on one side of an electronic device. FIG. 3 shows a perspective view of the antenna module of FIG. 2 and an enlarged view of a partial area.

(a) of FIG. 1 shows a substrate with an antenna module 1000*b* for each area. A substrate 1010*a* may include a central region CR and a periphery PE surrounding the central region CR. The periphery PE of the substrate 1010*a* may include a first part P1 to a fourth part P4. The first part P1 constitutes a bottom region of the substrate 1010*a*, and the second part P2 constitutes one side region of the substrate 1010*a*. The third part P3 constitutes another side region of the substrate 1010*a*, and the fourth part P4 constitutes a top region of the substrate 1010*a*.

Referring to FIGS. 1 and 2, the antenna module 1000*a* may include a substrate 1010*a*, a first array antenna 1200*a*, a second array antenna 1300*a*, a third array antenna 1100*a*, and a fourth array antenna 1100*b*. Since the third and fourth array antennas 1100*a* and 1100*b* are disposed on the one side region and the another side region of the substrate 1010*a*, they may be referred to as first and second side array antennas.

(a) of FIG. 2 is a sectional view of the antenna module 1000*a*, and (b) of FIG. 2 is a sectional view of the substrate 1010*a* shown for each layer. (a) of FIG. 3 is a perspective view illustrating one side region based on the center of the antenna module 1000*a*. (b) of FIG. 3 is an enlarged view illustrating an area where some of dipole antennas DA1 to DA4 constituting the second array antenna 1300*a* of the antenna module are disposed.

Referring to FIG. 2, an RFIC 1400*a* may be disposed on the first layer La1 of the antenna module 1000*a*. A plurality of ground layers may be disposed in an inner region of the antenna module 1000*a*. For example, first, second, third, and fourth ground layers GND1, GND2, GND3, and GND4 may be disposed on the second, fourth, fifth, and seventh layers La2, La4, La5, and La7.

Conductive patterns in the inner region of the antenna module 1000*a* may be stacked in a height direction with being spaced apart from one another by a plurality of dielectric layers. For example, the first dielectric layer GND1 may be disposed between the first and second layers La1 and La2, and the second dielectric layer GND2 may be disposed between the third and fourth layers La3 and La4. The third dielectric layer GND3 may be disposed between the fourth and fifth layers La4 and La5, and the fourth dielectric layer GND4 may be disposed between the sixth and seventh layers La6 and La7.

A plurality of coplanar waveguide layers may be disposed on the respective layers in the inner region of the antenna module 1000*a*. A first coplanar waveguide layer WG1 in which a plurality of signal connection lines and ground portions are formed may be disposed on the third layer La3. A second coplanar waveguide layer WG2 in which a plurality of signal connection lines and ground portions are formed may be disposed on the sixth layer La6.

It may be considered that a plurality of dielectric layers are disposed on respective layers corresponding to ground layers of the antenna module 1000*a*. In this regard, a plurality of dielectric layers may be disposed in the inner region of the antenna module 1000*a*. For example, first, second, third, and fourth dielectric layers DL1, DL2, DL3, and DL4 may be disposed on the second, fourth, fifth, and seventh layers La2, La4, La5, and La7.

Referring to FIG. 2, the first layer La1 may be an interface layer IL of the RFIC 1400*a*, and the second layer La2 is the first ground layer GND1 having ground and via. The first dielectric layer DL1 may be disposed between the first and second layers La1 and La2, and the second layer La2 may include the first ground layer GND1 and the first dielectric layer DL1.

The third layer La3 is a first coplanar waveguide layer WG1 in which a plurality of conductive patterns and ground portions are formed. The fourth layer La4 is the second ground layer GND2 including ground and via. The second dielectric layer DL2 may be disposed between the third and fourth layers La3 and La4, or the fourth layer La4 may include the second dielectric layer DL2.

The third dielectric layer DL3 may be disposed between the fourth and fifth layers La4 and La5, or the fifth layer La5 may include the third dielectric layer DL3. The fifth layer La5 is the third ground layer GND3 including ground and via. The sixth layer La6 is the second coplanar waveguide layer WG2 in which a plurality of conductive patterns and ground portions are formed. The fourth dielectric layer DL4 may be disposed between the sixth and seventh layers La6 and La7, or the seventh layer La7 may include the fourth dielectric layer DL4.

Referring to FIGS. 1 to 3, a ground wall (GW) 1130 is formed on the periphery PE of the substrate 1010*a* and includes vias connecting a plurality of layers. The ground wall (GW) 1130 is disposed in one axial direction and another axial direction between patch antennas PA11 to PA28 to surround each of the patch antennas PA11 to PA28.

The ground wall (GW) 1130 operates as a ground for radiation of the patch antennas PA11 to PA28 and may be referred to as a ground cavity wall. The ground wall (GW) 1130 suppresses side surface radiation and rear surface radiation of the patch antennas PA11 to PA28 having a front surface radiation structure, and functions as a reflector toward the front surface. The ground wall (GW) 1130 suppresses side surface radiation and rear surface radiation in another side direction of monopole antennas MA1 to MA6 having a side surface radiation structure, and functions as a reflector toward the front surface in one side direction. In addition, the ground wall (GW) 1130 suppresses side surface radiation in a top direction of dipole antennas DA1 to DA10 having a bottom radiation structure, and functions as a reflector in a bottom direction.

The antenna module 1100*a* may include a first ground layer 1300*g*, a second ground layer 1200*a*, and a third ground layer 1300*g*. The ground wall 1130 may be formed on the first ground layer 1100*g*. The second coplanar waveguide layer WG2 may be disposed on the second ground layer 1200*g*. The first coplanar waveguide layer WG1 may be disposed on the third ground layer 1300*g*. The ground wall 1130 may include a first horizontal ground region GH1, a second horizontal ground region GH2, and vertical ground walls GV1 to GV4 connecting the first and second horizontal ground regions GH1 and GH2.

The first array antenna 1200*a* may further include dummy patches DP11 to DP22 disposed on one side and another side of the patch antennas PA11 to PA28. Among the dummy patches DP11 to DP22, the first dummy patch DP11 is disposed between the first patch antenna PA11 in a first row and the second part P2. The second dummy patch DP12 is disposed between the second patch antenna PA12 in the first row and the second part P2. Among the dummy patches DP11 to DP22, the third dummy patch DP21 is disposed between the first patch antenna PA21 in a second row and the third part P3. The fourth dummy patch DP22 is disposed between the second patch antenna PA22 in the second row and the third part P3.

The ground wall (GW) 1130 may be formed to surround the dummy patches DP11 to DP22. First patch elements 1210 of the plurality of patch antennas PA11 to PA28 may be connected to feed lines. The dummy patches DP11 to DP22 are not connected to the feed lines. Second patch elements 1220 of the plurality of patch antennas PA11 to PA28 are not connected to the feed lines.

A distance between the ground wall (GW) 1130 and the dummy patches DP11 to DP22, respective sizes thereof, and the like may be implemented within a predetermined range based on a half wavelength of an operating frequency of 60 GHz. Layer positions and sizes of conductive plates CP11 to CP28 corresponding to coupling pads and overlap areas with the patch antennas PA11 to PA28 may be designed in consideration of radiation characteristics and disposition characteristics.

Referring to FIGS. 1 to 3, the antenna module 1000*a* may further include a millimeter wave transceiver circuitry 1400*a*.

The substrate 1010*a* may include a first surface S1, a second surface S2, a periphery PE, and a central region CR. The periphery PE may be formed between the first surface S1 and the second surface S2. The first surface S1 may be opposite to the second surface S2. The substrate 1010*a* may be implemented as a multi-layer substrate. For example, the substrate 1010*a* may be implemented as a 12-layer substrate, but is not limited thereto, and may vary depending on applications. The first surface S1 of the substrate 1010*a* may correspond to a surface of a twelfth layer La12.

The substrate 1010*a* may have a plurality of side surfaces. Among the plurality of side surfaces, the first surface S1 may be disposed to face a front direction of the antenna module 1000*a*, and the second surface S2 may be disposed to face a rear direction of the antenna module 1000*a*. Among the plurality of side surfaces, the third and fourth surfaces S3 and S4 may be disposed to face left and right directions, respectively. Among the plurality of side surfaces, a fifth surface S5 may be configured to face a bottom direction of the antenna module.

The third array antenna 1100*a* and the fourth array antenna 1100*b* may be disposed on the second part P2 and the third part P3 of the periphery PE of the substrate 1010*a*. The third array antenna 1100*a* and the fourth array antenna 1100*b* may form beam patterns to side regions of the electronic device. The third array antenna 1100*a* and the fourth array antenna 1100*b* may radiate horizontally polarized signals to the side regions of the electronic device.

The third array antenna 1100*a* may include a plurality of monopole antennas MA1 to MA3 disposed on the second part P2 of the periphery PE of the substrate 1010*a*. The fourth array antenna 1100*b* may include the plurality of monopole antennas MA4 to MA6 disposed on the third part P3 of the periphery PE of the substrate 1010*a*. The third array antenna 1100*a* and the fourth array antenna 1100*b* may be implemented with three antenna elements on one side and another side of the periphery PE of the substrate 1010*a*, respectively. The third array antenna 1100*a* may be implemented as a 1×3 array antenna on one side of the substrate 1010*a*, but is not limited thereto. The fourth array antenna 1100*b* may be implemented as a 1×3 array antenna on another side of the substrate 1010*a*, but is not limited thereto.

The first array antenna 1200*a* may be disposed on the first surface S1 of the substrate 1010*a*. The first array antenna 1200*a* may form a beam pattern toward the front region of the electronic device. The first array antenna 1200*a* may radiate a horizontally polarized signal to the front region of the electronic device. The first array antenna 1200*a* may be implemented as 16 antenna elements on the center region CR of the substrate 1010*a*.

The first array antenna 1200*a* may include the plurality of patch antennas PA11 to PA18 and PA21 to PA28 disposed on the first surface S1 of the substrate 1010*a*. The dummy patches DP11 and DP21 may be disposed on one side of the patch antennas PA11 and P21 to suppress side surface radiation. The dummy patches DP12 and DP22 may be disposed on another side of the patch antennas PA11 and P21 to suppress side surface radiation. The first array antenna 1200*a* may be implemented as 16 2×8 array antennas on the center region CR of the substrate 1010*a*, but is not limited thereto.

Each patch antenna of the first array antenna 1200*a* may include first patch elements 1210 and second patch elements 1220. The second patch elements 1220 may be stacked in a direction perpendicular to the first patch elements 1210 such that signals of the first patch elements 1210 are coupled. The center of the second patch element 1220 may be offset from the center of the first patch element 1210 in one axial direction.

A second gap between adjacent first patch elements 1221 and 1222 may be larger than a first gap between adjacent second patch elements 1211 and 1212. To this end, the first patch element 1221 in a first column may be disposed to be offset in the left direction with respect to the second patch element 1211 in the first column. Meanwhile, the first patch element 1222 in a second column may be disposed to be offset in the right direction with respect to the second patch element 1212 in the second column. A current flow direction of a signal applied to the second patch element 1211 in the first column is the left direction, and a current flow direction of a signal applied to the second patch element 1212 in the second column is the right direction. The current flow directions of the signals applied to the second patch elements 1211 and 1212 in the first and second columns are opposite to each other.

Accordingly, a phase difference of the signals applied to the second patch elements 1211 and 1212 in the first and second columns is supposed to be 180 degrees so that the current flow directions can be the same. To this end, the RFIC 1400*a* may control a phase shifter such that the phase difference between the signals applied to the first patch elements 1211 and 1212 in the first and second columns is 180 degrees.

The second array antenna 1300*a* may be disposed on the first part P1 of the periphery PE of the substrate 1010*a*. The second array antenna 1300*a* may form a beam pattern toward the bottom region of the electronic device. The second array antenna 1300*a* may radiate a horizontally polarized signal to the bottom region of the electronic device.

The second array antenna 1300*a* may include a plurality of dipole antennas DA1 to DA10 disposed on the first part P1 of the periphery PE of the substrate 1010*a*. The second array antenna 1300*a* may be implemented as 10 antenna elements on the lower side of the periphery PE of the substrate 1010*a*. The second array antenna 1300*a* may be implemented as 10 1×10 array antennas on the lower side of the periphery PE of the substrate 1010*a*, but is not limited thereto.

The plurality of array antennas may be disposed in an X-axial direction (one axial direction) and a Y-axial direction (another axial direction) of the substrate 1010*a*. The third array antenna 1100*a* and the fourth array antenna 1100*b* may include a plurality of monopole antennas MA1 to MA3 and MA4 to MA6 disposed in the another axial direction. The first array antenna 1200*a* may include a plurality of patch antennas PA11 to PA18 and PA21 to PA28 disposed in the one axial direction. The second array antenna 1300*a* may include a plurality of dipole antennas DA1 to DA10 disposed in the one axial direction.

The millimeter wave transceiver circuitry 1400*a* may be disposed on the second surface S2. The millimeter wave transceiver circuitry 1400*a* may be configured to transmit and receive signals at frequencies between 10 GHz and 400 GHz using at least one of the first array antenna 1200*a*, the second array antenna 1300*a*, and the third and fourth array antennas 1100*a* and 1100*b*. The millimeter wave transceiver circuitry 1400*a* may be configured to transmit and receive signals at frequencies between 10 GHz and 400 GHz using at least one of the plurality of monopole antennas MA1 to MA6, the plurality of patch antennas PA11 to PA18 and PA21 to PA28, and the plurality of dipole antennas DA1 to DA10. The millimeter wave transceiver circuitry 1400*a* may be referred to as a radio frequency integrated chip (RFIC).

The number of elements of the first array antenna 1200*a* forming the beam pattern toward the front region may be set to be greater than the number of elements of the second array antenna 1300*a* forming the beam pattern toward the bottom region. The number of elements of the second array antenna 1300*a* forming the beam pattern toward the bottom region may be set to be greater than the number of elements of the third and fourth array antennas 1100*a* and 1100*b* forming the beam pattern toward the side regions.

In this regard, 16 pins among 32 pins of the RFIC 1400*a* may be connected to the first array antenna 1200*a* forming the beam pattern toward the front region. Ten pins of the 32 pins of the RFIC 1400*a* may be connected to the second array antenna 1300*a* forming the beam pattern toward the bottom region. 6 pins of the 32 pins of the RFIC 1400*a* may be connected to the third and fourth array antennas 1100*a* and 1100*b* forming the beam pattern toward the side regions.

In this regard, the first array antenna 1200*a* has the largest number of elements, so it can transmit signals over a long distance to the front region of the electronic device, but has a narrow beam coverage. The narrow beam coverage can be supplemented by changing a beam forming direction to a horizontal direction of the front region. Accordingly, the number of elements of the first array antenna 1200*a* may be plural in one axial direction and two in another axial direction. For example, the second array antenna 1300*a* may be implemented as 2×8 array antennas. A beam may be formed upward by a predetermined angle from the front direction through a phase difference between signals applied between the antenna elements in the first row and the antenna elements in the second row.

The electronic device needs to perform AV wireless communication with another electronic device disposed in a bottom region of the electronic device. For the AV wireless communication, beamforming may be implemented in units of narrow beam coverage in a horizontal direction, which is the one axial direction, in the bottom region of the electronic device. Meanwhile, it is not necessary to transmit a signal to a bottom region of the electronic device over a long distance. Accordingly, the number of elements of the second array antenna 1300*a* may be plural in the one axial direction and one in the another axial direction. For example, the second array antenna 1300*a* may be implemented as 1×8, 1×10, or 1×12 array antennas.

Signals may be transferred to the side regions of the electronic device in an indoor radio environment where the electronic device is disposed. It is more important to implement a wide beam coverage for the side regions of the electronic device even without beamforming, than to implement a signal transmission over a long distance. In this regard, since the number of elements of the third and fourth array antennas 1100*a* and 1100*b* is the smallest, a wide beam coverage to the side regions of the electronic device can be achieved. Accordingly, the number of elements of the third and fourth array antennas 1100*a* and 1100*b* may be plural in the one axial direction and one in the another axial direction. For example, the third and fourth array antennas 1100*a* and 1100*b* may be implemented as 1×3 array antennas on one side and another side.

Figure 4A:
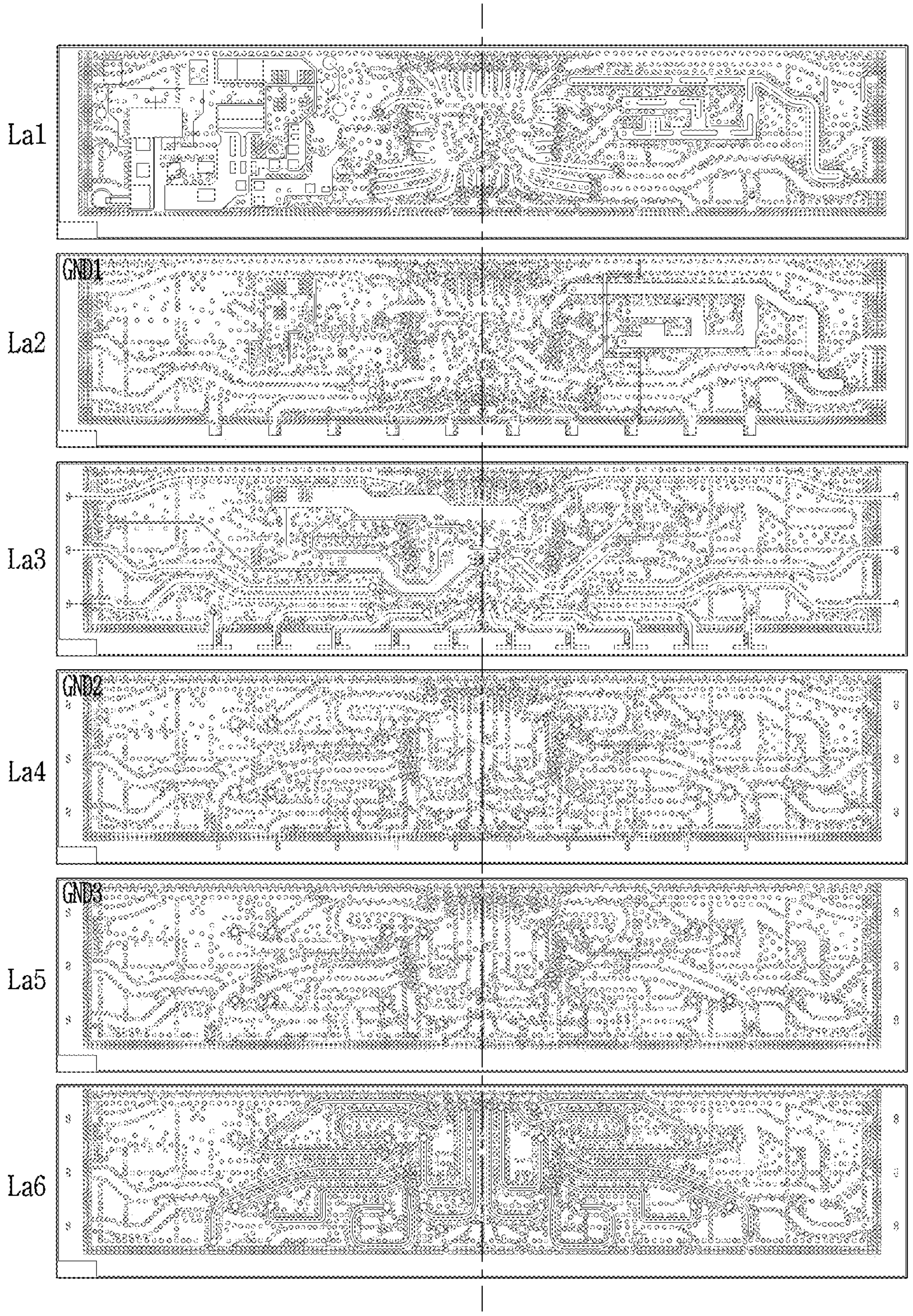
FIGS. 4A and 4B are front views illustrating the antenna module of FIGS. 1 to 3 for each layer.
Figure 4B:
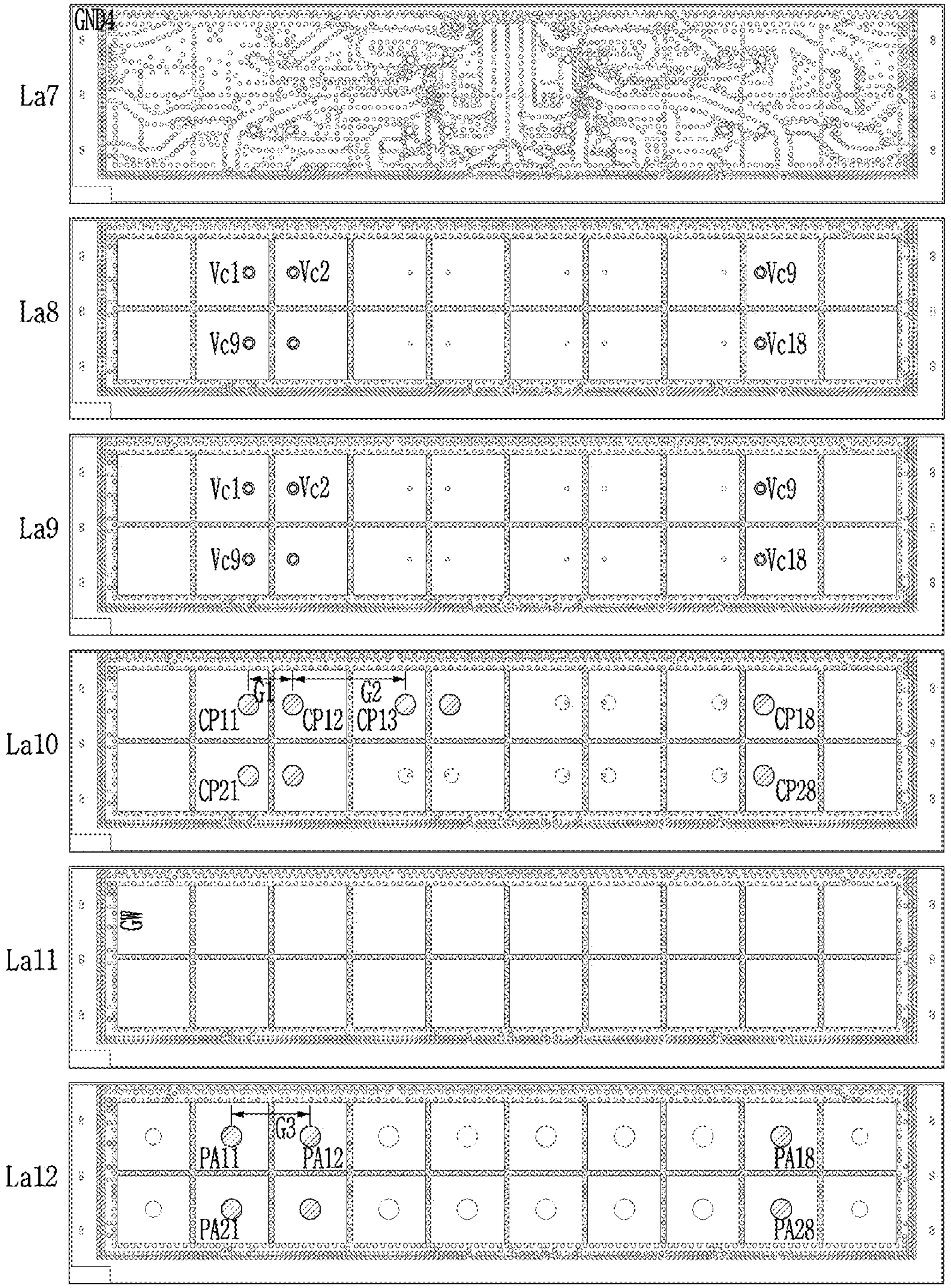
Figure 4C:
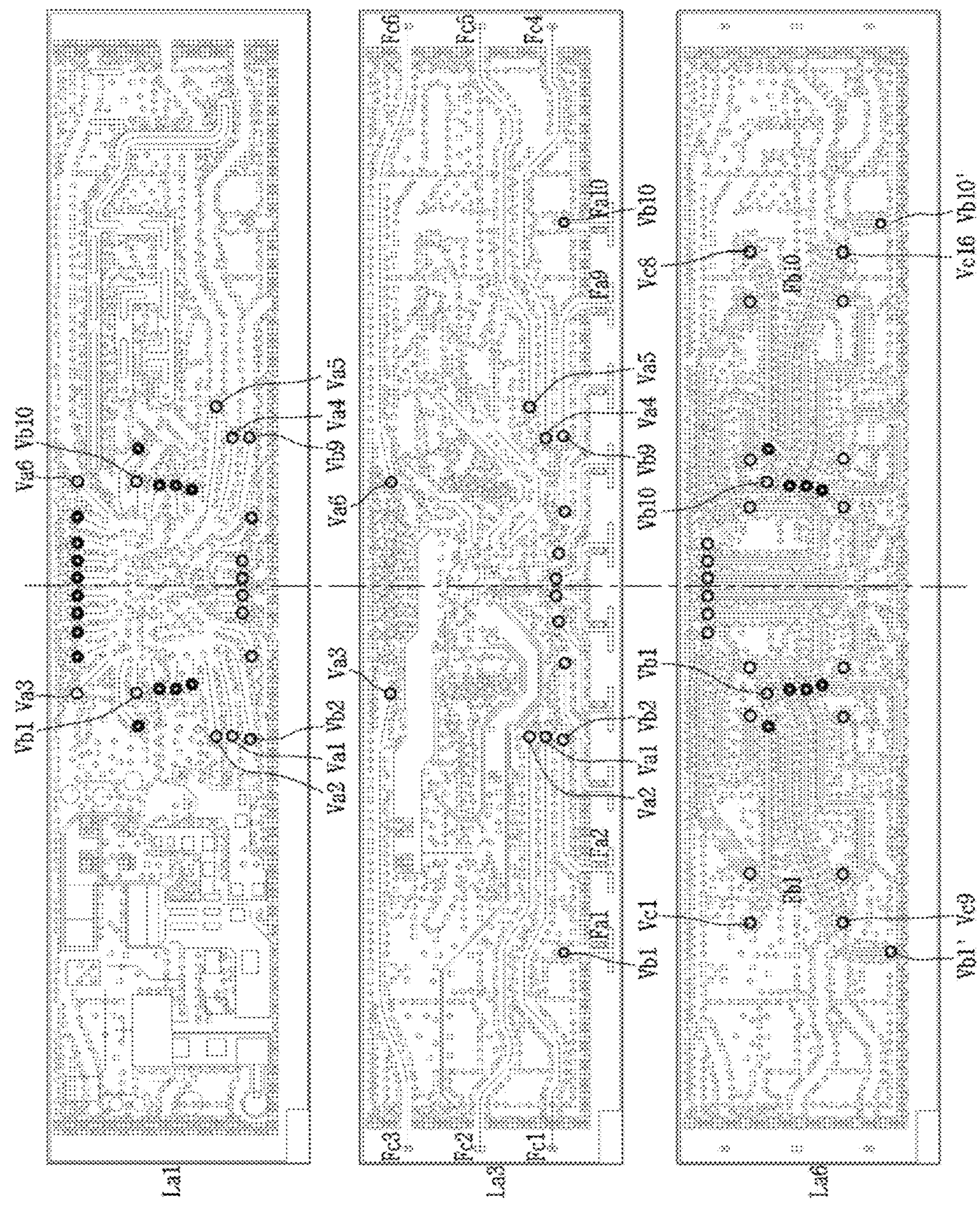
FIG. 4C is an enlarged view of first, third, and sixth layers among a plurality of layers of a PCB of FIG. 4A.

Hereinafter, a disposition structure for each layer of the antenna module according to the present disclosure will be described. In this regard, FIGS. 4A and 4B are front views illustrating the antenna module of FIGS. 1 to 3 for each layer. FIG. 4C is an enlarged view of first, third, and sixth layers among a plurality of layers of a PCB of FIG. 4A.

Referring to FIGS. 1 to 4, each layer of the antenna module 1000*a* will be described in detail with reference to FIGS. 1 to 4B. The antenna module 1000*a* may be configured by stacking layers from a first layer La1, on which the transceiver circuitry 1400*a* is disposed, to a sixth layer La6, on which the feed lines for the first array antenna 1200*a* are located. In addition, the antenna module 1000*a* may further include layers from a seventh layer La7, which is a ground layer for the sixth layer La6, to a twelfth layer La12, on which antenna elements of the first array antenna 1200*a* are disposed.

The transceiver circuitry 1400*a* may be disposed on the first layer La1. The transceiver circuitry 1400*a* may have a plurality of pins, and connection lines may be connected to the plurality of pins. The transceiver circuitry 1400*a* may be disposed based on a center line of the first layer La1 in one axial direction.

The second layer La2 may include a metal layer on the central region CR, so as to be configured as a first ground layer GND1 for the first layer La1. The monopole antennas MA1 to MA6 of the third and fourth array antennas 1100*a* and 1100*b* may be disposed on one side region and another side region of the third layer La3.

The dipole antennas DA1 to DA10 of the second array antenna 1300*a* may be disposed in a bottom region of the third layer La3.

The fourth layer La4 may include a metal layer on the central region CR, so as to be configured as a second ground layer GND2 for the third layer La3. The first and second feed lines of the third layer La3 are disposed between the first ground layer of the second layer La2 and the second ground layer of the fourth layer La4. Accordingly, the first and second feed lines of the third layer La3 constitute a first coplanar waveguide structure in which ground layers are disposed on an upper layer and a lower layer in a heightwise direction. The metal layers of the first and second ground layers may be partially removed so that the first and second type vias can be vertically connected.

The fifth layer La5 may include a metal layer on the central region CR, so as to be configured as a third ground layer GND3 for the sixth layer La6. On the sixth layer La6, first feed lines for the patch antennas PA11 to PA18 and PA21 to PA28 of the first array antenna 1200*a* may be disposed. Distances between one end portion and another end portion of the first feed lines may be the same.

The outermost dipole antennas DA1 and DA10 of the third layer La3 may be connected through fourth feed lines of the sixth layer La6.

The seventh layer La7 may include a metal layer on the central region CR, so as to be configured as a fourth ground layer GND4 for the sixth layer La6. The third and fourth feed lines of the sixth layer La6 are disposed between the third ground layer of the fifth layer La5 and the fourth ground layer of the fifth layer La5. Accordingly, the third and fourth feed lines of the sixth layer La6 constitute a second coplanar waveguide structure in which ground layers are disposed on an upper layer and a lower layer in a heightwise direction. The metal layers of the third and fourth ground layers may be partially removed so that the second and third type vias can be vertically connected.

As described above, the second, fourth, fifth, and seventh layers La2, La4, La5, and La7 may configure the first to fourth ground layers GND1 to GND4, respectively. The substrate 1010*a* may include the first ground layer GND1 for the transceiver circuitry 1400*a* to the fourth ground layer GND4 for the first array antenna 1200*a*. The third and fourth array antennas 1100*a* and 1100*b* may vertically extend from a layer between the first ground layer GND1 and the second ground layer GND2 to the upper layer of the fourth ground layer GND4.

The first array antenna 1200*a* may be disposed on the upper layer of the fourth ground layer GND4. The second array antenna 1300*a* may be disposed on a layer between the first ground layer GND1 and the second ground layer GND2. Accordingly, even if the same horizontal polarization is implemented through the first and second array antennas 1200*a* and 1300*a*, mutual interference hardly occurs due to the second to fourth ground layers GND2 to GND4.

In the RFIC 1400*a*, a length of a feed pattern of the first array antenna 1200*a* may be configured to be the same for all antenna elements. The length of the feed pattern of the first array antenna 1200*a* may be determined as the sum of a first length L1*a* to a fourth length L4*a*. The length of the feed pattern may be configured to be the same for all the patch antennas PA11 to PA18 and PA21 to PA28 of the third array antenna 1200*a*. First length L1*a* to the fourth length L4*a* may be configured to be the same for all the patch antennas PA11 to PA18 and PA21 to PA28. Accordingly, signals applied from the RFIC 1400*a* to all of the patch antennas PA11 to PA18 and PA21 to PA28 are in phase, and a beam can be formed toward the center point in the front direction.

First and second via pads VP1 and VP2 may be formed in eighth and ninth layers La8 to La9 to vertically connect the third type vias Vc1 to Vc8 and Vc9 to Vc16. Conductive plates CP11 to CP18 and CP21 to CP28 connected to ends of the third type vias Vc1 to Vc8 and Vc9 to Vc16 may be disposed on a tenth layer La10. The conductive plates CP1 to CP18 and CP21 to CP28 may be referred to as power feeding plates. A first gap G1 between the adjacent conductive plates CP11 and CP12 may be shorter than a second gap G2 between the adjacent conductive plates CP12 and CP13.

A metal layer forming a ground wall GW may be partially disposed on the eleventh layer La11. The conductive plates of the monopole antennas MA1 to MA6 configuring the third and fourth array antennas 1100*a* and 1100*b* may be disposed on one side region and another side region of the third layer La3 to the eleventh layer La11.

On the twelfth layer La12, the patch antennas PA11 to PA18 and PA21 to PA28 of the second array antenna 1300*a* may be disposed. Centers of the patch antennas PA11 to PA18 and PA21 to PA28 may be offset in another axis direction from the conductive plates CP11 to CP18 and CP21 to CP28. A third gap G3 between the adjacent patch antennas PA11 and PA12 may be formed to be longer than the first gap G1 and shorter than the second gap G2.

Figure 5:
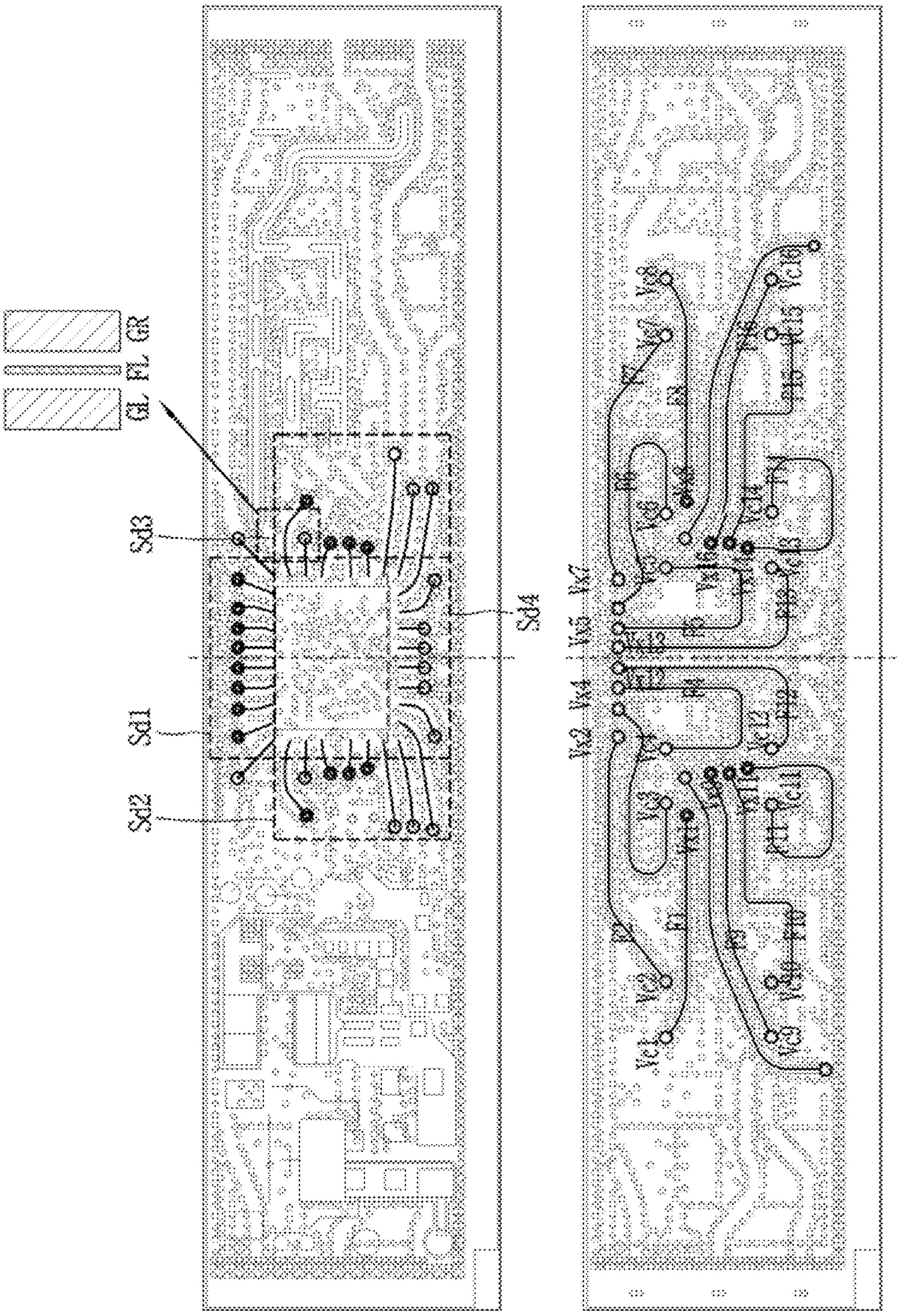
FIG. 5 is an enlarged view of first and sixth layers among a plurality of layers of a PCB of FIG. 4A.
Figure 6:
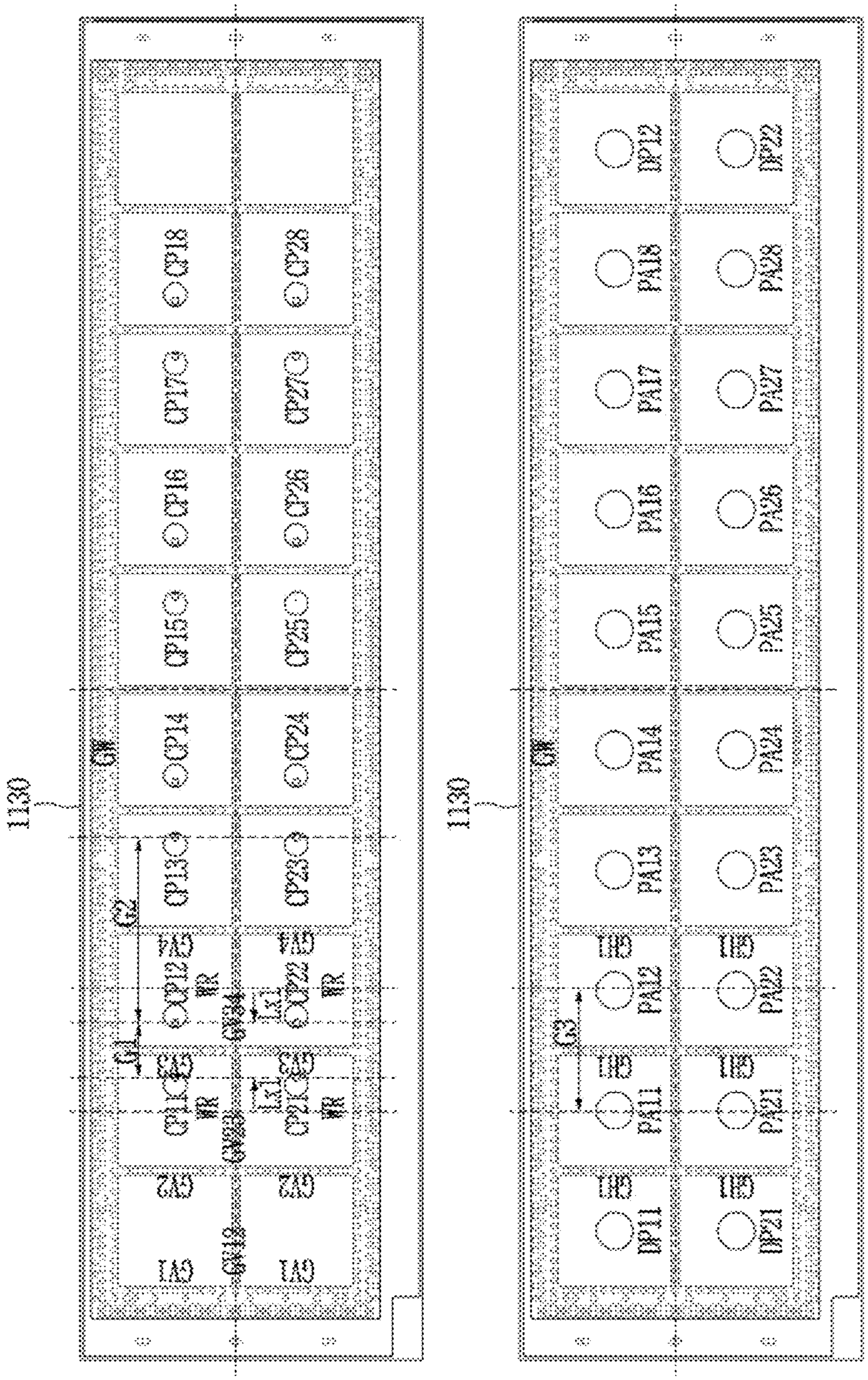
FIG. 6 is an enlarged view of tenth and twelfth layers among a plurality of layers of a PCB of FIG. 4B.

Hereinafter, a feeding structure for each layer of a first array antenna that performs front surface radiation in an antenna module implemented as a multi-layered antenna package according to the present disclosure will be described in detail. In this regard, FIG. 5 is an enlarged view of first and sixth layers among the plurality of layers of the PCB of FIG. 4A. FIG. 6 is an enlarged view of tenth and twelfth layers among a plurality of layers of a PCB of FIG. 4B.

Referring to FIGS. 1 to 6, signal connection lines (feed lines) of the first layer La1 and the sixth layer La6 may be formed in a coplanar waveguide structure. The signal connection lines of the first layer La1 and the sixth layer La6 may be disposed as feed lines FL on a central portion of the coplanar waveguide structure. In the coplanar waveguide structure of the first layer La1 and the sixth layer La6, ground regions GL and GR may be disposed at one side and another side of the feed lines FL on the central portion. A plurality of ground vias may be disposed in the ground regions GL and GR to be connected to ground regions of other layers. Boundaries on one side and another side of the coplanar waveguide structure may be spaced apart from boundaries of the ground regions GL and GR by predetermined distances.

The RFIC 1400*a* may be disposed on a central portion of the first layer La1. The plurality of pins of the RFIC 1400*a* may be connected to feed lines of a first side Sd1 as a top region, feed lines of a second side Sd2 as one side region, feed lines of a third side Sd3 as another side region, and feed lines of a fourth side Sd4 as a bottom region.

End portions Vc1 to Vc8 of first to eighth feed lines F1 to F8 may be disposed in the top region with respect to a central axis of the PCB 1010*a*. End portions Vc9 to Vc16 of ninth to sixteenth feed lines F9 to F16 may be disposed in the bottom region with respect to the central axis of the PCB 1010*a*.

The first to third feed lines F1, F2, and F3 of the sixth layer La6 are formed in a structure disposed in the top (left) region of the PCB 1010*a*. The fourth feed line F4 of the sixth layer La6 is formed in a structure connected from the top region back to the top region via the bottom region. A portion of the fourth feed line F4 is disposed at a position overlapping the inside of the RFIC 1400*a*.

The ninth to eleventh feed lines F9, F10, and F11 of the sixth layer La6 are formed in a structure disposed in the bottom (left) region of the PCB 1010*a*. The twelfth feed line F12 of the sixth layer La6 is formed in a structure connected from the top region to the bottom region of the PCB 1010*a*. One end portion Vx12 of the twelfth feed line F12 is disposed in the top region and another end portion Vc12 is disposed in the bottom region. A portion of the twelfth feed line F12 is disposed at a position overlapping the inside of the RFIC 1400*a*.

The sixth to eighth feed lines F6, F7, and F8 of the sixth layer La6 are formed in a structure disposed in the top (right) region of the PCB 1010*a*. The fifth feed line F5 of the sixth layer La6 is formed in a structure connected from the top region back to the top region via the bottom region. A portion of the fifth feed line F5 is disposed at a position overlapping the inside of the RFIC 1400*a*.

The fourteenth to sixteenth feed lines F14, F15, and F16 of the sixth layer La6 are formed in a structure disposed in the bottom (right) region of the PCB 1010*a*. The thirteenth feed line F13 of the sixth layer La6 is formed in a structure connected from the top region to the bottom region of the PCB 1010*a*. One end portion Vx13 of the thirteenth feed line F13 is disposed in the top region and another end portion Vc13 is disposed in the bottom region. A portion of the thirteenth feed line F13 is disposed at a position overlapping the inside of the RFIC 1400*a*.

End portions of the feed lines at the first side Sd1 of the first layer La1 may be connected to end portions Vx2, Vx3, Vx4, Vx12, Vx13, Vx5, Vx6, and Vx7 of the feed lines F2, F3, F4, F12, F13, F5, F6, and F7 of the sixth layer La6 through the vertical vias. End portions of the feed lines at the second side Sd2 of the first layer La1 may be connected to end portions Vx1, Vx9, and Vx10, and Vx11 of the feed lines F1, F9, F10, and F11 of the sixth layer La6 through the vertical vias. End portions of the feed lines at the third side Sd3 of the first layer La1 may be connected to end portions Vx8, Vx14, Vx15, and Vx16 of the feed lines F8, F14, F15, and F16 of the sixth layer La6 through the vertical vias.

The feed lines F1 to F16 for all antenna elements constituting the first array antenna 1200*a* may be formed to have the same length on the sixth layer La6. Ground layers on which vias are formed are disposed at one side and another side of the feed lines F1 to F16. Accordingly, the sixth layer La6 on which the feed lines F1 to F16 are formed is configured as a coplanar waveguide layer.

Center positions of another end portions Vc1 to Vc16 of the feed lines F1 to F16 for all antenna elements constituting the first array antenna 1200*a* correspond to feeding points for all the antenna elements through the vertical vias. In this regard, FIG. 9 is an enlarged view of the tenth and twelfth layers, on which the first and second patch elements are disposed, among the plurality of layers of FIG. 6B.

The feed lines F1 to F16 for all the antenna elements constituting the first array antenna 1200*a* may be formed in a symmetrical structure with respect to an Y axis as a vertical axis. The first and eighth feed lines F1 and F8 may be formed in a symmetrical structure with respect to the Y axis. A plurality of regions of the first and eighth feed lines F1 and F8 are formed as straight lines parallel to an X axis. Considering a coordinate difference in the vertical axis between the one end portions Vx1 and Vx8 and the another end portions Vc1 and Vc8 of the first and eighth feed lines F1 and F8, partial regions of end points of the first and eighth feed lines F1 and F8 may be formed with a curved portion and an inclined straight line.

The second and seventh feed lines F2 and F7 may be formed in a symmetrical structure with respect to the Y axis. A plurality of regions of the second and seventh feed lines F2 and F7 are formed as straight lines parallel to the X axis. Considering a coordinate difference in the vertical axis between the one end portions Vx2 and Vx7 and the another end portions Vc2 and Vc7 of the second and seventh lines F2 and F7, partial regions of end points of the second and seventh feed lines F2 and F7 may be formed with a curved portion and an inclined straight line. The first and eighth feed lines F1 and F8 may have the same length and also the second and seventh feed lines F2 and F7 may have the same length.

The third and sixth feed lines F3 and F6 may be formed in a symmetrical structure with respect to the Y axis. The third and sixth feed lines F3 and F6 may include two straight lines parallel to the X axis. A distance between the two straight lines of each of the third and sixth feed lines F3 and F6 may be ¼ or more of a wavelength corresponding to an operating frequency, so that mutual interference can be maintained below a predetermined level. The first and eighth feed lines F1 and F8 may have the same length, the second and seventh feed lines F2 and F7 may have the same length, and the third and sixth feed lines F3 and F6 may have the same length.

The fourth and fifth feed lines F4 and F5 may be formed in a symmetrical structure with respect to the Y axis. The fourth and fifth feed lines F4 and F5 may include two straight lines parallel to the Y axis. A distance between the two straight lines of each of the fourth and fifth feed lines F4 and F5 may be ¼ or more of a wavelength corresponding to an operating frequency, so that mutual interference can be maintained below a predetermined level. The first and eighth feed lines F1 and F8, the second and seventh feed lines F2 and F7, the third and sixth feed lines F4 and F5, and the fourth and fifth feed lines F4 and F5 may have the same length, respectively.

The ninth and sixteenth feed lines F9 and F16 may be formed in a symmetrical structure with respect to the Y axis. The ninth and sixteenth feed lines F9 and F16 each may include a straight line parallel to the X axis, a straight line inclined upward, and a straight line inclined downward.

The tenth and fifteenth feed lines F10 and F15 may be formed in a symmetrical structure with respect to the Y axis. The tenth and fifteenth feed lines F10 and F15 each may include a straight line parallel to the X axis, a straight line inclined upward, and two straight lines parallel to the Y axis. A distance between the two straight lines of each of the tenth and fifteenth feed lines F10 and F15 may be ¼ or more of a wavelength corresponding to an operating frequency, so that mutual interference can be maintained below a predetermined level. The ninth and sixteenth feed lines F9 and F16 may have the same length and also the tenth and fifteenth feed lines F10 and F15 may have the same length.

The eleventh and fourteenth feed lines F11 and F14 may be formed in a symmetrical structure with respect to the Y axis. The eleventh and fourteenth feed lines F11 and F14 each may include two straight lines parallel to the X axis, and two straight lines parallel to the Y axis. A distance between the two straight lines of each of the eleventh and fourteenth feed lines F11 and F14 may be ¼ or more of a wavelength corresponding to an operating frequency, so that mutual interference can be maintained below a predetermined level. The ninth and sixteenth feed lines F9 and F16 may have the same length, the tenth and fifteenth feed lines F10 and F15 may have the same length, and the eleventh and fourteenth feed lines F11 and F14 may have the same length.

The twelfth and thirteenth feed lines F12 and F13 may be formed in a symmetrical structure with respect to the Y axis. The twelfth and thirteenth feed lines F12 and F13 each may include a straight line parallel to the X axis, and a straight line parallel to the Y axis. The ninth and sixteenth feed lines F9 and F16, the tenth and fifteenth feed lines F10 and F15, the eleventh and fourteenth feed lines F11 and F14, and the twelfth and thirteenth feed lines F12 and F13 may have the same length, respectively.

In addition, the first to eighth feed lines F1 to F8 in the top region based on the X axis of the sixth layer La6 and the ninth to sixteenth feed lines F9 to F16 in the bottom region based on the X axis of the sixth layer La6 may all be formed in the same way. This can suppress a beam direction from being changed or beam quality from being degraded due to a phase difference applied to each antenna element, which is caused by a difference in length of the feed lines for each layer.

The tenth layer La10 may include a plurality of first patch elements CP11 to CP18 and CP21 to CP28. Among the plurality of first patch elements, the patch elements CP11 and CP12 adjacent to each other in one axial direction may be spaced apart from each other by a first gap G1. Among the plurality of first patch elements, the patch elements CP12 and CP13 adjacent to each other in the one axial direction may be spaced apart from each other by a second gap G2.

The twelfth layer La12 may include a plurality of second patch elements PA11 to PA18 and PA21 to PA28. Among the plurality of second patch elements PA11 to PA18 and PA21 to PA28, the adjacent patch elements may be disposed to be spaced apart from each other equally by a third gap G3 in the one axial direction.

In this regard, the first patch elements CP11 and CP21 in a first row may be disposed to be offset by a first distance Lx1 in a positive axial direction from a center of a window region WR within the ground wall 1130. Meanwhile, the first patch elements CP12 and CP22 in a second row may be disposed to be offset by the first distance Lx1 in a negative axial direction from the center of the window region WR within the ground wall 1130. The first distance Lx1 may be determined as (G3−G1)/2.

The first patch elements CP13, CP15, CP17, CP23, CP25, and CP27 in third, fifth, and seventh rows may be disposed to be offset by the first distance Lx1 in the positive axial direction from the center of the window region WR within the ground wall 1130. On the other hand, the first patch elements CP14, CP16, CP18, CP23, CP26, and CP28 in fourth, sixth, and eighth rows may be disposed to be offset by the first distance Lx1 in the positive axial direction from the center of the window area WR within the ground wall 1130. The first distance Lx1 may be determined as (G3−G1)/2.

Feeding point Vc1 to Vc16 of the feed lines F1 to F16 for all the antenna elements constituting the first array antenna 1200*a* correspond to feeding positions of the first patch elements CP11 to CP18 and CP21 to CP28. Accordingly, the feeding points Vc1 to Vc16 of the feed lines F1 to F16 are vertically connected through the vertical vias to points that are offset from the centers of the first patch elements CP11 to CP18 and CP21 to CP28. Therefore, the feeding positions of the first patch elements CP11 to CP18 and CP21 to CP28 are defined as the points offset from the centers of the first patch elements CP11 to CP18 and CP21 to CP28 according to the feeding points Vc1 to Vc16 determined for impedance matching.

Center positions of another end portions Vc1 to Vc16 of the feed lines F1 to F16 for all the antenna elements constituting the first array antenna 1200*a* correspond to center positions of the feeding points for all the antenna elements through the vertical vias.

Hereinafter, a plurality of antenna structures in a multi-layered antenna package implemented as a coplanar wave-guide layer according to the present disclosure will be described with reference to FIGS. 1 to 6.

A description will be given of a plurality of antenna structures in a multi-layered antenna package implemented as a coplanar waveguide layer according to the present disclosure, with reference to FIGS. 1 to 6. The antenna module 1000*a* may include a radio frequency integration circuit (RFIC) 1400*a*, a first dielectric layer DL1, a first coplanar waveguide layer WG1, a second dielectric layer DL2, a third dielectric layer DL3, a second coplanar wave-guide layer WG2, and a fourth dielectric layer DL4. The antenna module 1000*a* may further include a first antenna portion 1300*a* and a second antenna portion 1200*a*.

The RFIC 1400*a* may be configured to transmit radio frequency (RF) signals. The RFIC 1400*a* may be operably coupled to the first antenna portion 1300*a* and the second antenna portion 1200*a*. The RFIC 1400*a* may generate a beamformed radio signal by adjusting phases of signals applied to the first antenna portion 1300*a* and the second antenna portion 1200*a*.

The first dielectric layer DL1 may be disposed directly on an interface layer IL of the RFIC 1400*a*. The first coplanar waveguide layer WG1 may be disposed on a top of the first dielectric layer DL1. The first coplanar waveguide layer WG1 may be configured to receive an RF signal transmitted by the interface layer IL of the RFIC 1400*a* and convey the received RF signal to the first antenna portion 1300*a*. The first coplanar waveguide layer WG1 may be configured to transmit the RF signal received from the first antenna portion 1300*a* to the interface layer IL of the RFIC 1400*a*.

The second dielectric layer DL2 may be disposed on the first coplanar waveguide layer WG1. The third dielectric layer DL3 may be disposed on the second dielectric layer DL2. The second coplanar waveguide layer WG2 may be disposed on a top of the third dielectric layer DL3.

The second coplanar waveguide layer WG2 may be configured to receive an RF signal transmitted by the interface layer IL of the RFIC 1400*a* and convey the received RF signal to the second antenna portion 1200*a*. The second coplanar waveguide layer WG2 may be configured to transmit the RF signal received from the second antenna portion 1200*a* to the interface layer IL of the RFIC 1400*a*.

The first antenna portion 1300*a* may be disposed on the first coplanar waveguide layer WG1. The first antenna portion 1300*a* may be configured to radiate a signal trans-mitted from the first coplanar waveguide layer WG1. The second antenna portion 1200*a* may be disposed on the second coplanar waveguide layer WG2. The second antenna portion 1200*a* may be configured to radiate a signal trans-mitted from the second coplanar waveguide layer WG2.

The first coplanar waveguide layer WG1 may include a plurality of first signal connection lines Fa1 to Fa10 and a first ground portion GP1. The first coplanar waveguide layer WG1 may be disposed on a third layer La3. The plurality of first signal connection lines Fa1 to Fa10 and the first ground portion GP1 may be disposed to be flush with each other on the top of the first dielectric layer DL1. The first dielectric layer DL1 and the second dielectric layer DL2 may operate as shields of the first coplanar waveguide layer WG1. The first ground layer GND1 on the first dielectric layer DL1 and the second ground layer GND2 on the second dielectric layer DL2 may operate as shields of the first coplanar waveguide layer WG1.

The second coplanar waveguide layer WG2 may include a plurality of second signal connection lines F1 to F16 and a second ground portion GP2. The second coplanar wave-guide layer WG2 may be disposed on a sixth layer La6. The plurality of second signal connection lines F1 to F16 and the second ground portion GP2 may be disposed to be flush with each other on the top of the third dielectric layer DL3. The third dielectric layer DL3 and the fourth dielectric layer DL4 may operate as shields of the second coplanar waveguide layer WG2. The third ground layer GND3 on the third dielectric layer DL3 and the fourth ground layer GND4 on the fourth dielectric layer DL4 may operate as shields of the second coplanar waveguide layer WG2.

A part (DA2 to DA9) of the first antenna portion 1300*a* may be connected to the signal connection lines Fa2 to Fa9 of the first coplanar waveguide layer WG1. Another part (DA1 and DA10) of the first antenna portion 1300*a* may be connected to the signal connection lines Fb1 and Fb10 of the second coplanar waveguide layer WG2. The another part (DA1 and DA10) of the first antenna portion 1300*a* may be connected to the signal connection lines Fb1 and Fb10 of the second coplanar waveguide layer WG2 through the signal connection lines Fa1 and Fa10 of the first coplanar wave-guide layer WG1.

The antenna module 1000*a* may include a plurality of ground layers GND1 to GND4 and a plurality of array antennas 1100*a*, 1100*b*, 1200, and 1300. The first ground layer GND1 may be disposed between the first dielectric layer DL1 and the second dielectric layer DL2. The second ground layer GND2 may be disposed between the second dielectric layer DL2 and the third dielectric layer DL3. The third ground layer GND3 may be disposed between the third dielectric layer DL3 and the fourth dielectric layer DL4. The fourth dielectric layer DL4 may be disposed on the top of the fourth dielectric layer GND4.

The antenna module 1000*a* may include a first array antenna 1200*a*, a second array antenna 1300*a*, and third and fourth array antennas 1100*a* and 1100*b*. The third and fourth array antennas 1100*a* and 1100*b* may be disposed on one side and another side of the second dielectric layer DL2 between the first and second ground layers GND1 and GND2. The first antenna portion 1300*a* and the second antenna portion 1200*a* may correspond to the second array antenna 1300*a* and the first array antenna 1200*a*, respec-tively.

The interface layer IL of the RFIC 1400*a*, the first ground layer GND1, and the first coplanar waveguide layer WG1 may correspond to the first layer La1, the second layer La2, and the third layer La3 of the PCB 1010*a*, respectively. The second and third ground layers GND2 and GND3 and the second coplanar waveguide layer WG2 may correspond to the fourth layer La4, the fifth layer La5, and the sixth layer La6 of the PCB 1010*a*, respectively.

A group of third feed lines Fc1 to Fc6 for feeding the third and fourth array antennas 1100*a* and 1100*b* may be con-nected through vias Va1 to Va6 from the first layer La1 to the third layer La3. The group of the third feed lines Fc1 to Fc6 may be connected to the antennas MA1 to MA6 of the third and fourth array antennas 1100*a* and 1100*b* of the third layer La3, respectively.

The second array antenna 1300*a* may be disposed on a lower side of the second dielectric layer DL2 between the first and second ground layers GND1 and GND2. The second array antenna 1300*a* may be disposed on the same plane as the third and fourth array antennas 1100*a* and 1100*b*. A first group Fa1 to Fa10 of second feed lines for feeding the second array antenna 1300*a* may be disposed on the top of the second dielectric layer DL2 between the first and second ground layers GND1 and GND2. A second group Fb1 and Fb10 of the second feed lines may be disposed on the top of the second dielectric layer DL3 between the first and second ground layers GND3 and GND4.

The second group Fb1 and Fb10 of the second feed lines may be connected through first vias Vb1 and Vb10 from the first layer La1 to the sixth layer Vb10. The second group Fb1 and Fb10 of the second feed lines may be connected by feed lines having predetermined lengths on the sixth layer La6. The second group Fb1 and Fb10 of the second feed lines may be connected through second vias Vb1' and Vb10' from the sixth layer La6 to the third layer La3. The second group Fb1 and Fb10 of the second feed lines may be connected to the outermost antennas DA1 and DA10 of the second array antenna 1300*a* through the feed lines Fa1 and Fa10 on the third layer La3.

The first array antenna 2100*a* may include first patch elements 1210 and second patch elements 1220 disposed on the tenth layer La10 and the twelfth layer La12 of the PCB 1010*a*. The first feed lines for feeding the first array antenna 1200*a* may include first top feed lines F1 to F8 on a top region, and first bottom feed lines F9 to F16 on a bottom region. The second group Fb1 and Fb10 of the second feed lines may be disposed between the first feed lines F1 to F16. The second group Fb1 and Fb10 of the second feed lines may be disposed between the first top feed lines F1 to F8 and the first bottom feed lines F9 to F16. One Fb1 of the second group of the second feed lines may be disposed between a pair F1 and F9 of the first feed lines. Another one Fb10 of the second group of the second feed lines may be disposed between another pair F8 and F16 of the first feed lines.

A length of the first group Fa1 to Fa10 of the second feed lines may increase from a central region toward side regions. The length of the first group Fa1 to Fa10 of the second feed lines may have a phase difference by ¼ of a wavelength of an operating frequency. A second pair Fb4 and Fb7 of the second feed lines may be longer than a first pair Fb5 and Fb6 of the second feed lines by ¼ of the wavelength. A third pair Fb3 and Fb8 of the second feed lines may be longer than the second pair Fb4 and Fb7 of the second feed lines by ¼ of the wavelength. A fourth pair Fb2 and Fb9 of the second feed lines may be longer than the third pair Fb3 and Fb8 of second feed lines by ¼ of the wavelength. A fifth pair Fa1+Fb1 and Fa10+Fa10 of the second feed lines may be longer than the fourth pair Fb2 and Fb9 of the second feed lines by ¼ of the wavelength. The second feed lines Fa1 to Fa10 disposed on the third layer La3 may be formed in a symmetrical shape with respect to the Y-axis of a center line.

The RFIC 1400*a* may include a plurality of pins disposed on a first side Sd1 as a top region, a second side Sd2 as one side region, a third side Sd3 as another side region, and a fourth side Sd4 as a bottom region.

The feed lines of the first layer La1 connected to the first group Fa1 to Fa10 of the second feed lines disposed on the third layer La3 may be connected to the fourth side surface Sd4 of the RFIC 1400*a*. The feed lines of the first layer La1 connected to the first group Fa1 to Fa10 of the second feed lines may be formed in a symmetrical shape with respect to the Y-axis of the center line.

The feed lines of the first layer La1 connected to the second group Fb1 and Fb10 of the second feed lines disposed on the sixth layer La6 may be connected to the second and third side surfaces Sd2 and Sd3 of the RFIC 1400*a*. The feed lines of the first layer La1 connected to the second group Fb1 and Fb10 of the second feed lines may be formed in a symmetrical shape with respect to the Y-axis of the center line.

The feed lines of the first layer La1 connected to the second group Fb1 and Fb10 of the second feed lines disposed on the sixth layer La6 may be disposed between the first feed lines F1 to F16. The feed lines of the first layer La1 connected to the second group Fb1 and Fb10 of the second feed lines disposed on the sixth layer La6 may be formed in a symmetrical shape with respect to the Y-axis of the center line.

Meanwhile, the signal connection lines on the first and second coplanar waveguide layers WG1 and WG2 of the multi-layered antenna package according to the present disclosure may form ground planes on one side and another side of the same plane. The ground planes may also be formed on the top and bottom regions of the signal connection lines on the first and second coplanar waveguide layers WG1 and WG2.

In this regard, the first dielectric layer DL1 may include a ground plane GND1. A first ground portion GP1 is disposed on the same plane as the signal connection lines of the first coplanar waveguide layer WG1 disposed on the second dielectric layer DL2. The ground planes GND1 and GND2 are also disposed on the top and bottom sides of the signal connection lines of the first coplanar waveguide layer WG1 in the height direction. Therefore, the second dielectric layer DL2 may include a double graded-ground plane having a pair of overlapped ground lines.

The antenna elements of the first antenna portion 1300*a* of the first coplanar waveguide layer WG1 may be implemented in a multi-layered ground structure by the double graded-ground plane. The signal connection lines Fa1 to Fa10 of the first antenna portion 1300*a* of the first coplanar waveguide layer WG1 may be formed by the double-graded ground plane, which has a pair of ground lines overlapping the first and second ground layers GND1 and GND2, between the first and second ground layers GND1 and GND2.

A second ground portion GP2 is disposed on the same plane as the signal connection lines of the second coplanar waveguide layer WG2 disposed on the third dielectric layer DL3. The ground planes GND3 and GND4 are also disposed on top and bottom sides of the signal connection lines of the second coplanar waveguide layer WG2 in the height direction. Therefore, the third dielectric layer DL3 may include a double graded-ground plane having a pair of overlapped ground lines. The fourth dielectric layer DL4 may include a ground plane GND4.

The antenna elements of the second antenna portion 1200*a* of the second coplanar waveguide layer WG2 may be implemented in a multi-layered ground structure by the double graded-ground plane. The signal connection lines F1 to F13 of the second antenna portion 1200*a* of the second coplanar waveguide layer WG2 may be formed by the double graded-ground plane, which has a pair of ground lines overlapping the third and fourth ground layers GND3 and GND4, between the third and fourth ground layers GND3 and GND4.

In the above, the disposition structure of the feed lines for each layer in the multi-layered antenna package having the plurality of array antennas according to one aspect of the present disclosure has been described. Hereinafter, a description will be given of a disposition structure of feed lines for each layer in a multi-layered antenna package including a plurality of array antennas formed in a plurality of coplanar waveguide structures according to another aspect of the present disclosure. In this regard, an antenna module 1000*a* implemented as a multi-layered antenna package including a plurality of array antennas formed in a plurality of coplanar waveguide structures will be described with reference to FIGS. 1 to 6.

The antenna module 1000*a* includes a transceiver circuitry 1400*a*, first resonating elements 1300*a*, second resonating elements 1200*a*, and a plurality of signal connection lines SL1 to SL4. The antenna module 1000*a* may further include a first coplanar waveguide WG1 and a second coplanar waveguide WG2. The first resonating elements 1300*a* may correspond to the second array antenna 1300*a*. The second resonating elements 1200*a* may correspond to the first array antenna 1200*a* and the phased array antenna portion 1200*a*.

The first coplanar waveguide layer WG1 may be configured to convey first signals at a frequency of 10 GHz or higher between the transceiver circuitry 1400*a* and the first resonating elements 1300*a*. The second coplanar waveguide layer WG2 may be configured to convey second signals at the frequency of 10 GHz or higher between the transceiver circuitry 1400*a* and the second resonating elements 1200*a*.

The first coplanar waveguide layer WG1 may be interposed between the second coplanar waveguide layer WG2 and the transceiver circuitry 1400*a*. The second coplanar waveguide layer WG2 may be interposed between the first coplanar waveguide layer WG1 and the second resonating element 1200*a*.

The first resonating elements 1300*a* may be interposed between the second coplanar waveguide layer WG2 and the transceiver circuitry 1400*a*. The second resonating elements 1200*a* may be disposed on an opposite side of the transceiver circuitry 1400*a*. The second resonating elements 1200*a* may configure a planar array antenna.

Each of the second resonating elements 1200*a* may include at least two patch antenna layers configured to radiate radio signals. The first patch antenna 1220 of the two patch antennas may be disposed on the first surface S1 of the PCB 1010*a*, and the first surface S1 may be the outermost surface of the PCB 1010*a*. The second patch antenna 1210 of the two patch antennas may be disposed inside the PCB 1010*a*. A portion of the first patch antenna 1220 and a portion of the second patch antenna 1210 may be stacked to overlap each other.

The plurality of signal connection lines SL1 to SL4 may be configured to connect the transceiver circuitry 1400*a* to the phased array antenna portion 1200*a*. Each of the plurality of signal connection lines SL1 to SL4 may be fed by being connected to the second patch antennas 1210 disposed inside the PCB 1010*a*. Each of the plurality of signal connection lines SL1 to SL4 may be configured not to be directly connected to the first patch antennas 1220 on the first surface S1 of the PCB 1010*a*.

A length of each of the plurality of signal connection lines SL1 to SL4 may be defined as a connected length between the transceiver circuitry 1400*a* and the phased array antenna portion 1200*a*. The plurality of signal connection lines SL1 to SL4 may have the same length for each of the second resonating elements 1200*a*.

The plurality of signal connection lines SL1 to SL4 may be disposed between the second resonating elements 1200*a* inside the PCB 1010*a* and the transceiver circuitry 1400*a*. The plurality of signal connection lines SL1 to SL4 may be disposed on the second coplanar waveguide layer WG2.

The second coplanar waveguide layer WG2 may be disposed on a conductive plate between two ground conductive plates GND3 and GND4 inside the PCB 1010*a*. The conductive plate of the second coplanar waveguide layer WG2 may include a plurality of signal connection lines SL3 and ground portions. The plurality of signal connection lines SL3 and ground portions may be disposed on the coplanar conductive plate between the two ground conductive plates GND3 and GND4 inside the PCB 1010*a*.

Each of the plurality of signal connection lines may include the first part SL1 to the fourth part SL4. The first part SL1 may be disposed on the second surface S2 of the PCB 1010*a*. The third part SL3 may be disposed on the second coplanar waveguide WG2. The second part S2 may be configured to electrically connect the first part SL1 and the third part SL3. The fourth part SL4 may be configured to electrically connect the third part SL3 and one of the second patch antennas 1210.

The PCB 1010*a* may include first to sixth layers La1 to La6. The first parts SL1 of the plurality of signal connection lines may be disposed on the first layer La1 of the PCB 1010*a*. The second parts SL2 of the plurality of signal connection lines may be first vertical vias formed from the first layer La1 to the sixth layer La6 of the PCB 1010*a*. The third parts SL3 of the plurality of signal connection lines may be disposed on the sixth layer La6 of the PCB 1010*a*. The fourth parts SL4 of the plurality of signal connection lines may be second vertical vias formed from the sixth layer La6 to the second patch antenna 1220.

For the second resonating elements 1200*a*, the first parts SL1 on the first layer La1 may have the same length. For the second resonating elements 1200*a*, the third parts SL3 on the sixth layer La6 may have the same length.

For the second resonating elements 1200*a*, the first vertical vias corresponding to the second parts SL2 may have the same length (height). For the second resonating elements 1200*a*, 1200*b*, the second vertical vias corresponding to the fourth parts SL4 may have the same height.

The feed lines of the first layer La1 may be connected to the feed lines F1 to F16 of the sixth layer La1 through the first vertical vias passing through the first and second ground layers GND1 and GND2. The feed lines F1 to F16 of the sixth layer La1 may be connected to the second patch antennas 1210. All of the feed lines F1 to F16 of the sixth layer La1 may be formed to have the same length.

The first resonating elements 1300*a* and the second resonating elements 1200*a* may constitute the first antenna portion 1300*a* and the second antenna portion 1200*a*, respectively. Some dipole antennas DA2 to DA9 of the first antenna portion 1300*a* may be connected to the signal connection lines Fa2 to Fa9 of the first coplanar waveguide layer WG1. Some other dipole antennas DA1 and DA10 of the first antenna portion 1300*a* may be connected to the signal connection lines Fb1 and Fb10 of the second coplanar waveguide layer WG2.

The transceiver circuitry 1400*a* may be disposed on the first dielectric layer DL1. The first coplanar waveguide layer WG1 may be disposed on the second dielectric layer DL2 and the second coplanar waveguide layer WG2 may be disposed on the third dielectric layer DL3. The second antenna portion 1300*a* and the first antenna portion 1200*a* may correspond to the second array antenna 1300*a* and the first array antenna 1200*a*, respectively.

The antenna module 1000*a* may include a first ground layer GND1, second and third ground layers GND2 and GND3, and a fourth ground layer GND4. The first ground layer GND1 may be disposed between the first dielectric layer DL1 and the second dielectric layer DL2. The second and third ground layers GND2 and GND3 may be disposed between the second dielectric layer DL2 and the third dielectric layer DL3. The fourth dielectric layer GND4 may be disposed on the top of the third ground layer GND3. The antenna module 1000*a* may include the third array antenna 1100*a* and the fourth array antenna 1100*b* that are disposed on one side and another side of the second dielectric layer DL2 between the first and second ground layers GND1 and GND2.

The first dielectric layer DL1, the first ground layer GND1, and the second dielectric layer DL2 may correspond to the first layer La1, the second layer La2, and the third layer La3, respectively. The second and third ground layers GND2 and GND3 and the third dielectric layer DL3 may correspond to the fourth layer La4, the fifth layer La5, and the sixth layer La6, respectively.

A group of third feed lines Fc1 to Fc6 for feeding the third and fourth array antennas 1100*a* and 1100*b* may be connected through vias Va1 to Va6 from the first layer La1 to the third layer La3. The group of the third feed lines Fc1 to Fc6 may be connected to antennas MA1 to MA6 of the first array antennas 1100*a* and 1100*b* of the third layer La3, respectively.

The second array antenna 1300*a* may be disposed on a lower side of the second dielectric layer DL2 between the first and second ground layers GND1 and GND2. A first group Fa1 to Fa10 of second feed lines for feeding the second array antenna 1300*a* may be disposed on the top of the second dielectric layer DL2 between the first and second ground layers GND1 and GND2. A second group Fb1 and Fb10 of the second feed lines may be disposed on the top of the second dielectric layer DL3 between the first and second ground layers GND3 and GND4.

So far, an electronic device having an antenna module has been described. The technical effects of the electronic device having the antenna module according to the present disclosure are as follows.

An electronic device according to an embodiment of the present disclosure may perform wireless communication of A/V data regardless of the location of an A/V transmitting device through first and second antenna structures in which a plurality of array antennas are disposed.

Furthermore, the A/V transmitting device may transmit two streams of data, thereby minimizing video quality deterioration that occurs when increasing a data compression rate.

In addition, since a horizontally polarized antenna and a vertically polarized antenna can be disposed together on one substrate, thereby allowing an antenna module to be compact and providing a high data reception rate.

Moreover, horizontally and vertically polarized signals may be used according to an array antenna disposition structure of the A/V transmitting device and the electronic device, thereby performing A/V wireless communication with reduced mutual interference while increasing a communication capacity.

Besides, horizontally and vertically polarized signals may be used in consideration of the location of the A/V transmitting device and electronic device the polarization characteristics of the array antennas, thereby performing A/V wireless communication with reduced mutual interference while increasing a communication capacity.

In addition, even when an obstacle is disposed on a wireless communication path between the A/V transmitting device and the electronic device, a beamforming direction may be changed and reflected waves may be used, thereby providing seamless A/V wireless communication.

Also, the number of array antennas disposed in a front region of the antenna module of the A/V transmitting device may be greater than the number of antennas in a side region or bottom region. Accordingly, signals can be transmitted over a longer distance in the front region of the antenna module than in the side region or bottom region. Also, an antenna module that has two-dimensional array antennas and is capable of transmitting signals even upward through beamforming can be implemented.

Also, the number of array antennas disposed in side regions of the antenna module of the A/V transmitting device may be greater than the number of antennas in other areas. Accordingly, an antenna module capable of achieving a wider beam coverage in the side regions than that in a front or bottom region can be implemented.

Each of a plurality of array antennas can be disposed in in different layered structures on different regions while implementing a coplanar waveguide structure, thereby minimizing interference between different array antennas.

Further scope of applicability of the present disclosure will become apparent from the following detailed description. It should be understood, however, that the detailed description and specific examples, such as the preferred embodiments of the present disclosure, are given by way of illustration only, since various modifications and alternations within the spirit and scope of the disclosure will be apparent to those skilled in the art. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An antenna module implemented in a multi-layered package, the antenna module comprising:

a radio frequency integration circuit (RFIC) configured to transmit RF signals;

a first dielectric layer disposed directly on an interface layer of the RFIC;

a first coplanar waveguide layer disposed on a top of the first dielectric layer and configured to receive signals transmitted by the interface layer of the RFIC;

a first antenna portion disposed on the first coplanar waveguide layer and configured to radiate signals transmitted from the first coplanar waveguide layer;

a second dielectric layer disposed on the first coplanar waveguide layer;

a third dielectric layer disposed on the second dielectric layer;

a second coplanar waveguide layer disposed on a top of the third dielectric layer and configured to receive RF signals transmitted by the interface layer of the RFIC;

a second antenna portion disposed on the second coplanar waveguide layer and configured to radiate signals transmitted from the second coplanar waveguide layer; and a fourth dielectric layer disposed on the third dielectric layer, wherein the first coplanar waveguide layer includes a plurality of first signal connection lines and a first ground portion that are disposed to be flush with each other on the top of the first dielectric layer, the first dielectric layer and the second dielectric layer operate as shields of the first coplanar waveguide layer, the second coplanar waveguide layer includes a plurality of second signal connection lines and a second ground portion that are disposed to be flush with each other on the top of the third dielectric layer, and the third dielectric layer and the fourth dielectric layer operate as shields of the second coplanar waveguide layer.

2. The antenna module of claim 1, wherein a part of the first antenna portion is connected to the signal connection lines of the first coplanar waveguide layer, and another part of the first antenna portion is connected to the signal connection lines of the second coplanar waveguide layer.

3. The antenna module of claim 1, wherein the second antenna portion and the first antenna portion correspond to a first array antenna and a second array antenna, respectively, and the antenna module further comprises:

a first ground layer disposed between the first dielectric layer and the second dielectric layer;

second and third ground layers disposed between the second dielectric layer and the third dielectric layer;

a fourth ground layer disposed on a top of the third ground layer; and third and fourth array antennas disposed between one side and another side of the second dielectric layer disposed between the first and second ground layers.

4. The antenna module of claim 3, wherein the first dielectric layer, the first ground layer, and the second dielectric layer correspond to a first layer, a second layer, and a third layer, respectively, the second and third ground layers and the third dielectric layer correspond to a fourth layer, a fifth layer, and a sixth layer, respectively, and a group of third and fourth feed lines for feeding the third and fourth array antennas are connected through vias from the first layer to the third layer, and connected to antennas of the third and fourth array antennas of the third layer, respectively.

5. The antenna module of claim 4, wherein the second array antenna is disposed on a bottom of the second dielectric layer between the first and second ground layers, a first group of second feed lines for feeding the second array antenna is disposed on the second dielectric layer between the first and second ground layers, a second group of the second feed lines is disposed on the third dielectric layer between the third and fourth ground layers, the second feed lines disposed on the third layer are formed in a symmetrical shape with respect to a center line of a Y-axis, a length of the first group of the second feed lines increases from a central region to a side region, and the length of the first group has a phase difference by ¼ of a wavelength of an operating frequency.

6. The antenna module of claim 5, wherein the second group of the second feed lines is connected through first vias from the first layer to the sixth layer, connected by feed lines having predetermined lengths on the fifth layer, connected through second vias from the sixth layer to the third layer, and connected by feed lines to outermost antennas of the second array antenna on the third layer.

7. The antenna module of claim 6, wherein first feed lines for feeding the first array antenna include first top feed lines on a top region, and first bottom feed lines on a bottom region, the second group of the second feed lines is disposed between the first feed lines, and the second group of the second feed lines is disposed between the first top feed lines and the first bottom feed lines.

8. The antenna module of claim 5, wherein the RFIC comprises a plurality of pins disposed on a first side surface as a top region, a second side surface as one side region, a third side region as a bottom region, and a fourth side surface as another side surface, feed lines of the first layer connected to the first group of the second feed lines disposed on the third layer are connected to the fourth side surface of the RFIC, and the feed lines of the first layer connected to the first group of the second feed lines are formed in a symmetrical shape with respect to a center line of the Y-axis.

9. The antenna module of claim 5, wherein feed lines of the first layer connected to the second group of the second feed lines disposed on the sixth layer are connected to the second and third side surfaces of the RFIC, feed lines of the first layer connected to the second group of the second feed lines disposed on the sixth layer are disposed between the third feed lines, and the feed lines of the first layer connected to the second group of the second feed lines are formed in a symmetrical shape with respect to a center line of the Y-axis.

10. The antenna module of claim 3, wherein signal connection lines of the first antenna portion of the first coplanar waveguide layer are formed as a double graded-ground plane having a pair of ground lines, which overlap the first and second ground layers, between the first and second ground layers, and signal connection lines of the second antenna portion of the second coplanar waveguide layer are formed as a double graded-ground plane having a pair of ground lines, which overlap the third and fourth ground layers, between the third and fourth ground layers.

* * * * *